United States Patent Office 2,936,783
Patented May 17, 1960

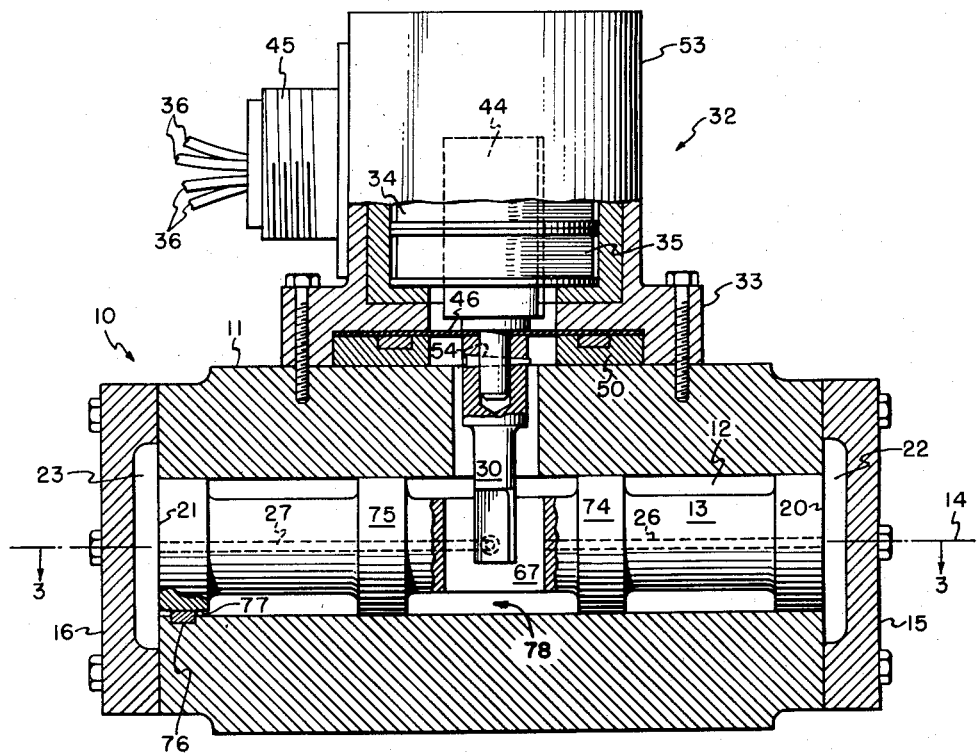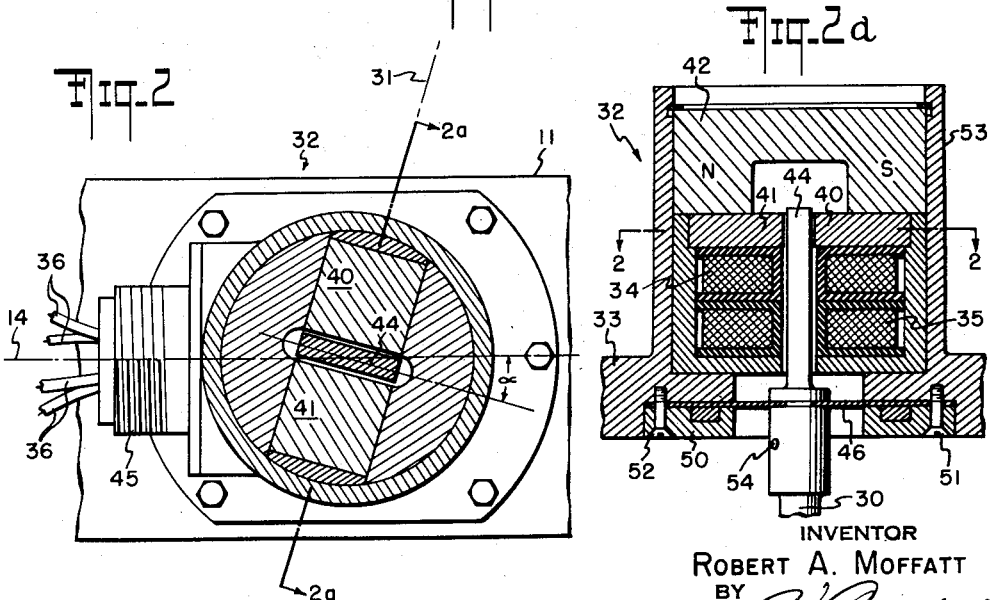

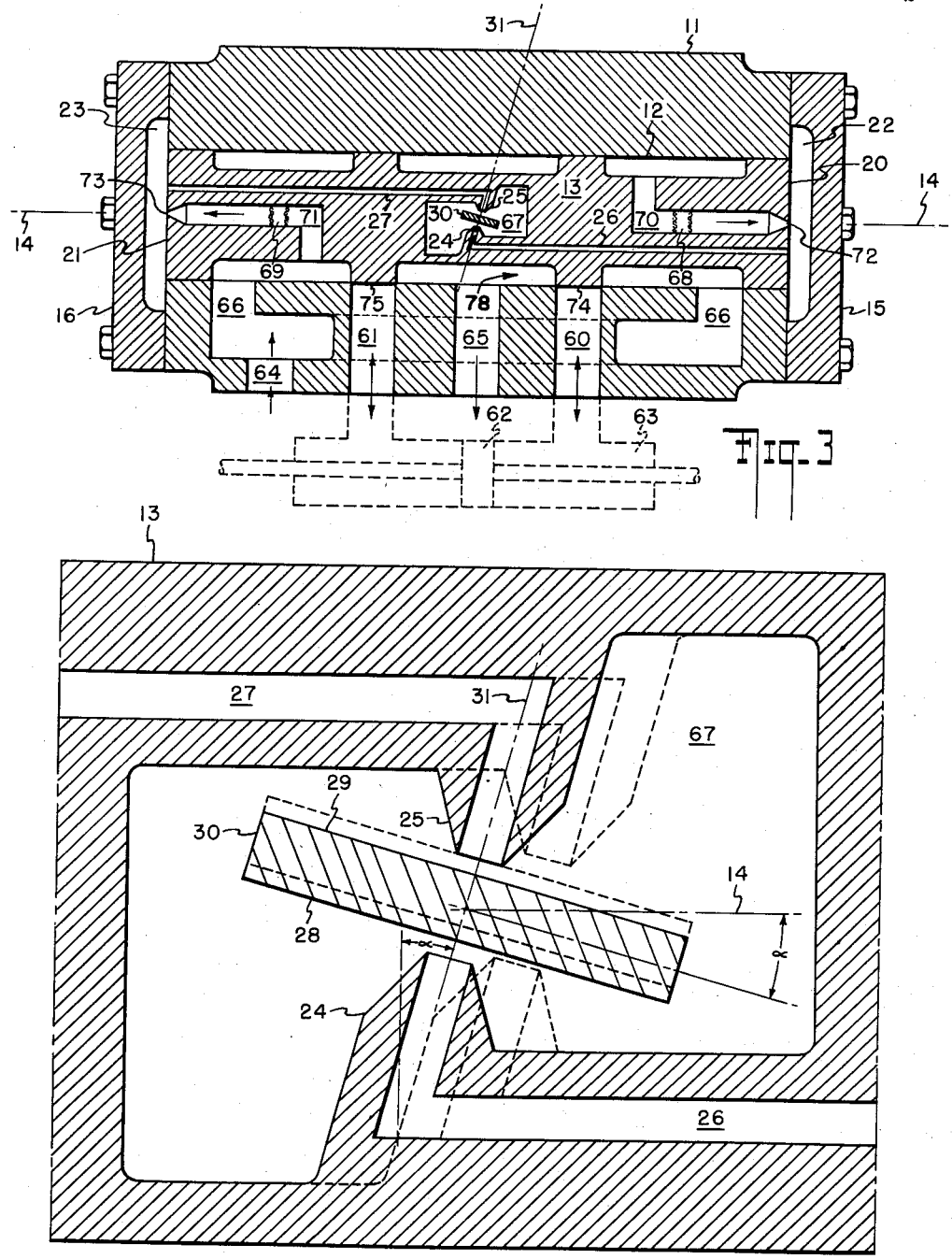

2,936,783

ELECTRO-HYDRAULIC SERVO CONTROL VALVE

Robert A. Moffatt, Mount Clemens, Mich., assignor to Sperry Rand Corporation, Great Neck, N.Y., a corporation of Delaware Application March 11, 1957, Serial No. 645,247

9 Claims. (Cl. 137—623)

This invention relates generally to hydraulic control systems and has reference more particularly to an electro hydraulic fluid control valve for controlling such a system.

Hydraulic positional control systems generally include a fluid sump or reservoir, a pump for circulating the fluid throughout the various elements of the system and a hydraulic actuator which is actuated by the circulating fluid and may be arranged to be of the reversible type wherein its direction of operation is dependent upon the direction of flow of fluid therethrough. Such a system further includes a control or servo valve which may be operated by any type of signal responsive means under the control of an operator or automatic signal producing means. The servo valve controls the rate of flow of fluid and the direction of such flow through the positioning of a member which is operated by said signal responsive means.

An electro-hydraulic servo valve converts an electrical signal into a controlled fluid flow and pressure which, in turn, may be subsequently utilized to move a mechanical actuator. Principally, the servo valve consists of two parts, the electro-magnetic driver, which converts the electrical signals into a mechanical displacement, and the metering section, which is controlled by the electro magnetic driver and which regulates the output flow. Generally, when such a valve is supplied from a constant pressure source, the output flow is proportional to the magnitude of the electrical input signal; the direction depending upon the sense of the signal.

The present invention relates to a novel form of an electro-hydraulic servo valve of this character. Such valves generally comprise a housing or body portion having suitable passages and ports connected with the source of pressure fluid, the hydraulic actuator, and a sump for receiving exhaust fluid. The housing portion has slidably mounted therein a piston-type valve spool which has surface areas or lands that cooperate with the ported passages of the housing to control the flow of fluid to and from the hydraulic actuator depending upon the position of the valve spool relative to the housing.

The servo valve of the present invention comprises a torque motor, a first stage and a second stage. The torque motor consists of a permanent magnet and an electromagnet which produces displacements of a spring-centered armature-flapper element that are proportional to the polarity and magnitude of the input currents. All the portions of the torque motor are isolated from the system fluid by means of a suitable diaphragm. The first stage consists of a pair of matched nozzles whose quiescent pressure is reduced from the supply pressure by means of suitable orifices. The valve spool is driven to a position proportional to flapper displacement by means of error pressure established in the closed loop. The flapper extends into the center of the valve spool and is set at an angle to the valve spool's longitudinal axis. The nozzles are a part of the valve spool and are normal to the flapper. When the flapper is commanded to a new position, the valve spool moves until the flapper is again centered between the nozzles. The second stage consists of the valve spool per se.

The present invention provides a flapper first-stage servo valve which employs hydraulic feedback of valve spool position, a feature usually available only in two stage valves having a spool first stage. Using hydraulic feedback, the second stage is completely free of side loading common to prior art valves due to centering or loading springs, thus serving to decrease the friction and hysteresis in the second stage. The present servo valve employs an internal closed loop to make valve spool displacement dependent upon flapper position and not upon the differential nozzle pressure resulting from flapper position, in the quiescent condition. This virtually eliminates first stage differential pressure as a static flow sensitivity parameter. Additional beneficial effects include the supply pressure modulation having much less effect upon static flow, resulting in greater system gain stability and reduced noise; also the static flow curve linearity is improved while the static flow sensitivity tolerance spread from unit to unit is reduced.

Another feature of the present invention is the mechanical advantage between the first and second stages serving to decrease the amount of torque motor movement per unit output flow of the second stage while maintaining hydraulic follow-up as a repeat-back loop.

Other features of the present invention over the prior art device include equal pressure on both sides of the flapper for any steady state position, improved repeatability, and the ability to vary the stroke of the valve spool by varying the angle of the flapper and nozzles.

It is an object of the present invention to provide a servo control valve wherein an input signal is amplified and converted to a proportional hydraulic response with a maximum of accuracy and response.

Another object is to provide an electro-hydraulic servo valve in which the operation is substantially independent of fluctuations or changes in the supply pressure of the pressure fluid.

A further object of the invention is to provide a servo control valve having a large hydraulic amplification preferably through a plurality of stages thereby permitting the use of smaller elements with a relatively weak input signal.

An additional object is to provide an electro-hydraulic servo valve that is simple in operation and construction while being readily adaptable to various operating conditions.

These and other objects of the invention will become apparent from the following description when taken in conjunction with the accompanying drawings wherein like reference numerals refer to similar parts throughout the several views of which Fig. 1 is a front elevational view in section of the electrohydraulic servo valve of the present invention;

Fig. 2 is a top plan view of a portion of the valve partly in section showing the torque motor and flapper as seen along line 2—2 of Fig. 2a;

Fig. 2a is a front elevational view in section of the torque motor and flapper as seen along line 2a—2a of Fig. 2;

Fig. 3 is a plan view of the valve in section taken along line 3—3 of Fig. 1; and Fig. 4 is an enlarged plan view in section of the nozzle and flapper arrangement of the valve shown in Fig. 3.

Referring now to Fig. 1 of the drawings, the electrohydraulic servo or main valve 10 comprises a housing or body portion 11 having a longitudinal bore 12 therein adapted to slidably receive a valve spool 13. The valve spool 13 has a longitudinal axis 14. The end plates 15 and 16 form closures for the two extremities of the housing 11. The end plates 15 and 16 have recesses therein which cooperate with the extremities of the bore 12 and the end land portions 20 and 21 of valve spool 13 to form first and second pressure fluid chambers 22 and 23, respectively.

As seen more clearly in Fig. 3, nozzles 24 and 25, which are preferably integrally mounted within the valve spool 13, are connected with suitable passages 26 and 27 within the valve spool that connect to pressure fluid chambers 22 and 23, respectively. Preferably, the areas of the nozzles 24 and 25, as well as passages 26 and 27, are substantially equal thereby providing nozzles having equal fluid flow characteristics. The nozzles 24 and 25 are opposed to each other within valve spool 13 and preferably mounted on a common axis 31 and at an angle with respect to the longitudinal axis 14 of the valve spool 13.

A positionable member or reaction plate, such as flapper 30, is disposed intermediate said nozzles 24 and 25 and adjacent thereto. The flapper 30 is positionable along axis 31 by torque motor 32 for varying the relative position of the flapper 30 with respect to the nozzles 24 and 25. The flapper 30 has parallel control surfaces 28 and 29, more clearly seen in Fig. 4, which are disposed perpendicular to the axis 31 defined by the axes of the nozzles 24 and 25. The parallel control surfaces 28 and 29 are preferably maintained perpendicular to the axis 31 as the flapper 30 is moved to provide a uniform flow pattern around the periphery of each nozzle.

Referring again to Fig. 1, a signal responsive means, such as torque motor 32, is mounted on housing 11 by annular support member 33. As seen in Figs. 2 and 2a, the torque motor 32 comprises dual coils 34 and 35 having terminals 36, pole pieces 40 and 41, permanent magnet 42 and armature 44. Alternatively, the torque motor 32 may have a single coil in lieu of the dual coils 34 and 35. The lower end of armature 44 forms flapper 30. The terminals 36 are connected through connector 45 to a suitable signal generating means (not shown). The flapper and armature combination are so mounted as to be pivotally supported and spring-centered by the resilient diaphragm 46. The flapper 30 and the armature 44 may be constructed as an integral member or may comprise separate elements as shown which are rigidly connected by suitable means such as pin 54 to move as a unit. The periphery of diaphragm 46 is fastened between the support member 33 and annular ring 50 by suitable fastening means such as screws 51 and 52. A suitable cover 53 is fastened to the support member 33 to enclose the torque motor 32.

As shown in the preferred embodiment of Fig. 2, the armature 44 of torque motor 32 is disposed intermediate the pole pieces 40 and 41 and is positionable along the axis 31. This may be conveniently accomplished by mounting the pole pieces 40 and 41 and other components of the torque motor 32 at an angle with respect to the longitudinal axis 14 with the common axis of pole pieces 40 and 41 being substantially parallel to the axis 31. As previously explained, the flapper 30, by virtue of being integrally connected to armature 44, will also be positionable along the axis 31. Preferably, the parallel control surfaces 28 and 29 of the flapper 30 are also disposed at an angle to the longitudinal axis 14 and as previously explained move along axis 31 while being maintained perpendicular thereto. While it is desirable to maintain the parallel control surfaces 28 and 29 perpendicular to axis 31, it is to be understood that the torque motor 32 and the armature 44 may be disposed for action along a line other than that defined by the axes of the nozzles 24 and 25. It is to be further understood that the axis 31 defined by axes of the nozzles 24 and 25 may itself be disposed at a different angle with respect to longitudinal axis 14 than the angle α as shown, which will be more fully described hereinafter.

Referring again to Fig. 3, the housing 11 is provided with a plurality of ported passages, the ports thereof being adapted to communicate with the bore 12. Housing 11 is provided with a pair of outlet ports 60 and 61. Outlet port 60 connects to one side of piston 62 of main hydraulic actuator 63 through a suitable conduit while outlet port 61 connects to the other side of piston 62 in a similar manner. Housing 11 also has a high pressure fluid inlet port 64 adapted to be connected by a conduit to the outlet side of a high pressure pump or other suitable source (not shown). Housing 11 further has an exhaust port 65 suitably connected to a sump (not shown). The high pressure fluid inlet port 64 communicates with ported passage 66 in housing 11 while passage 67 of valve spool 13 communicates with the exhaust port 65 through an annular groove 78. Passage 66 is adapted to communicate with passages 70 and 71 of valve spool 13 which in turn communicate through suitable filters 68 and 69 via suitable pressure reducing orifices 72 and 73 to pressure fluid chambers 22 and 23, respectively. Alternatively, passages 70 and 71, filters 68 and 69, and orifices 72 and 73 may be located in the housing 11 provided they communicate with pressure fluid chambers 22 and 23, respectively. It will be seen then that control of fluid in the conduits of the system connecting to the main hydraulic actuator 63 is provided by movement of the valve spool 13 as hereinafter described.

Valve spool 13, which is slidably fitted within bore 12 of housing 11, is provided with land portions which are adapted to control the flow of fluid through the servo-valve 10 to and from the hydraulic actuator 63. Land portions 74 and 75 are adapted to normally close the ports 60 and 61 to the pressure fluid in passage 66. Valve spool 13 is also provided with a pair of end land portions 20 and 21 which are adapted to form a portion of the pressure fluid chambers 22 and 23, respectively, as previously explained and also to provide surface areas to which pressure fluid is applied for controlling the operation of the servo valve, to be hereinafter more fully described. To prevent rotational movement of valve spool 13 relative to the housing 11 and flapper 30, while allowing translational movement with respect thereto, a means such as a key 76 may be mounted in the housing 11 to cooperate with a keyway 77 cut in valve spool 13 as shown in Fig. 1.

In the operation of the servo valve of the present invention, assuming a steady state or neutral condition, high pressure fluid enters through port 64 via passage 66 into passages 70 and 71. Then the high pressure fluid is suitably reduced in pressure by orifices 72 and 73 before entering pressure fluid chambers 22 and 23, respectively. The pressure fluid from chambers 22 and 23 enters nozzles 24 and 25 via passages 26 and 27, respectively. The nozzles 24 and 25 thereby project fluid jet streams of equal pressure and area along the axis 31 defined by the axes of the nozzles 24 and 25. The jet stream from each nozzle impinges upon opposite sides of flapper 30. The pressure fluid from the nozzles 24 and 25 returns to the sump via passage 67, annular groove 78 and port 65. Assuming a condition when the signal from the signal generating source is zero, the armature 44 of the torque motor 32 will be in a central or neutral position relative to the pole pieces 40 and 41. The flapper 30 will also be in a neutral position, i.e., equidistant from the nozzles 24 and 25, as indicated by the solid lines of Fig. 4. With the flapper 30 equidistant from the nozzles 24 and 25, the pressure within the nozzles remains equal. Thus the pressure within the pressure fluid chambers 22 and 23 also remains equal producing an equal force on each end land portion 20 and 21 of the valve spool 13. The valve spool 13 remains at rest, as shown in Fig. 3, with land portions 74 and 75 thereof completely closing the ports 60 and 61, respectively, and the fluid within the main hydraulic actuator 63 will, therefore, remain at rest.

Upon the application of an input signal, the armature 44 will move towards one or the other of the pole pieces 40 and 41 of the torque motor 32. The distance and direction of the movement of the armature 44 will be proportional to the magnitude of differential current applied to coils 34 and 35 and the polarity of the signal, respectively. The armature 44 works against the spring constant of the resilient diaphragm 46. The spring constant of the diaphragm 46 is linear within the operating range and therefore armature and consequently flapper displacement is proportional to the differential input current. Balanced currents when applied to the two halves of the coil with proper polarity will cause no displacement of the armature. When differential currents are applied, a differential magnetic force proportional to the differential current and amplified by the permanent magnet quiescent flux deflects the armature. The flapper 30 being rigidly attached to the armature 44, or an integral part thereof as previously explained, will be actuated in a corresponding manner around the pivot point at the diaphragm 46. Diaphragm 46 also acts as a seal between the torque motor 32 and the flapper 30 to prevent the fluid flowing around the torque motor thereby eliminating changes in the magnetic characteristics of the motor due to the adherence thereto of metal particles that may be suspended in the fluid.

Assume the movement of the armature 44 to be such that the flapper 30 moves in a direction along the axis 31 towards nozzle 25 as indicated by the dotted lines of Fig. 4. The flapper 30, in the position indicated by the dotted lines of Fig. 4, increases the fluid pressure within nozzle 25 and decreases the fluid pressure within nozzle 24 since the flow from nozzle 25 is more restricted while the flow from nozzle 24 is less restricted than previously. The change in pressure is reflected back through passage 27 and 26 to pressure fluid chambers 23 and 22, respectively, thereby creating a differential pressure between said chambers 23 and 22. The increased pressure in chamber 23 exerts a proportionately greater force against end land portion 21 while the decreased pressure in chamber 22 exerts a proportionately smaller force against end land portion 20 thereby positioning the valve spool 13 to the right as viewed in Figs. 3 and 4. The nozzles 24 and 25, which are movable with valve spool 13, are similarly positioned to the right as viewed in the drawings until the nozzles 24 and 25 reach a position where they are again equidistant from the flapper 30 as indicated by the new position of the nozzles 24 and 25 as shown by the dotted lines of Fig. 4.

In the new position shown, the pressure in nozzles 24 and 25 is now equal and consequently the pressure in chambers 22 and 23 is also equal thereby arresting the movement of valve spool 13. In the new position, the land portions 74 and 75 of valve spool 13 have also moved to the right thereby porting pressure fluid via passage 66 through port 61 to the left side of piston 62 of hydraulic actuator 63 as viewed in Fig. 3. At the same time, the right side of piston 62 is ported to exhaust the fluid therefrom through port 60 which now communicates via port 65 to the sump. In a similar manner, if the polarity of the input signal had been reversed, the flapper 30 would have been positioned towards nozzle 24 and the valve spool 13 would have moved towards the left until the pressure was equalized in chambers 22 and 23. When the input signal again goes to zero, the flapper 30 will resume its original position as shown by the solid lines in Fig. 4 and the valve spool 13 will return to its neutral position with the lands 74 and 75 covering ports 60 and 61, respectively.

The flapper 30, nozzles 24 and 25 and orifices 72 and 73 comprise the first stage of servo valve 10 while the valve spool 13 comprises the second stage. The mechanical advantage or amplification of the aforesaid first stage may be varied by varying the angle at which the nozzles 24 and 25 and the flapper 30 are disposed with respect to the longitudinal axis 14 of valve spool 13. As the angle α approaches zero degrees, the mechanical advantage becomes infinite; as the angle α approaches 90°, the mechanical advantage approaches one as a limit.

The mechanical advantage or amplification of the first stage of the servo valve 10 may be defined as the ratio of the displacement of the valve spool 13 along its longitudinal axis 14 with respect to the displacement of the flapper 30 along the axis 31. With the flapper 30 and nozzles 24 and 25 disposed at an angle α as shown in Fig. 4, a given displacement of the flapper 30 along the axis 31 will cause movement of the valve spool 13 along its axis 14 for a particular distance until nozzles 24 and 25 are again equidistant from surfaces 28 and 29, respectively, to provide a particular mechanical advantage in the first stage. If a larger mechanical advantage is desired in the first stage, the servo valve 10 may be designed with the flapper valve 30 and nozzles 24 and 25 disposed at an angle less than the angle α as viewed in Fig. 4. With the angle decreased, the same displacement of the flapper 30 along the axis 31 will require greater movement of the valve spool 13 along its axis 14 before nozzles 24 and 25 reach a new equilibrium position equidistant from surfaces 28 and 29, respectively. Conversely, increasing the angle α will decrease the mechanical advantage since the same displacement of the flapper 30 will require less movement of the valve spool 13 to reach equilibrium.

While the preferred embodiment of the invention has been described utilizing nozzles 24 and 25 disposed at an angle to the longitudinal axis 14 of the valve spool 13, it is within the scope of the present invention to mount the nozzles 24 and 25 perpendicularly with respect to the longitudinal axis 14 while maintaining the flapper 30 at an angle to said longitudinal axis 14. In the alternative embodiment, in order to maintain a constant flow area around the periphery of the nozzles 24 and 25 with respect to the flapper 30, it is desirable to have the peripheral extremities of the nozzles disposed parallel to that portion of the flapper that is adjacent to and cooperable with the nozzle.

It is also within the scope of the present invention to mount one or more reaction plates to move in accordance with the movement of the valve spool 13 while a pair of nozzles are positionable in accordance with the input signal and adapted to be cooperative with said one or more reaction plates.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A fluid control valve including a fluid input adapted for connection to a source of fluid under pressure, a signal input, means controlling the flow of said fluid to a fluid output, two oppositely directed nozzles each connected to said fluid pressure source through a separate hydraulic resistance, the axis of each nozzle making the same acute angle with a longitudinal axis of said valve, reaction means associated with said nozzles and arranged to be moved by said signal input along an axis making said acute angle with said longitudinal axis and means to operate said fluid flow control means and move said nozzles along said longitudinal axis in accordance with the pressure difference in said nozzles.

2. A servo control valve comprising a valve housing having a bore and pressure fluid control ports therein, a valve spool movably mounted in the bore in said housing for controlling the flow of fluid through said ports, said valve spool having a longitudinal axis concentric with the longitudinal axis of said bore, first and second pressure fluid chambers, pressure reducing means adapted to communicate with said first and second pressure fluid chambers, opposed first and second nozzles movable with said valve spool and connected to said first and second pressure fluid chambers respectively, and each disposed to project a pressure fluid stream in opposing relation with repect to the other such that the axes of the nozzles and the axes of the pressure fluid streams are substantially concentric and define an axis that is disposed at an acute angle with respect to the longitudinal axis of said spool, a pressure reaction plate intermediate said nozzles and adjacent thereto for varying the pressure in said pressure chambers, said pressure reaction plate having first and second effective areas substantially perpendicular to the axis defined by said pressure fluid streams, said nozzles and said plates each being relatively positionable with respect to each other, and means for positioning said plate in accordance with a desired condition.

3. A servo control valve as claimed in claim 2 wherein said nozzles are integrally mounted within said spool.

4. A servo control valve as claimed in claim 3 wherein at least a portion of said pressure reaction plate extends within said spool and is positionable substantially along the axis defined by the axes of said nozzles.

5. A servo control valve as claimed in claim 4 including means for preventing rotational movement of said valve spool relative to said pressure reaction plate.

6. An electro-hydraulic servo valve comprising a valve housing having a bore and pressure fluid control ports therein, a valve spool movably mounted in the bore in said housing for controlling the flow of fluid through said ports, first and second pressure fluid chambers, first and second nozzles integral with said valve spool and connected to said first and second pressure chambers, respectively, and disposed at an angle with respect to the longitudinal axis of said spool in opposing relation with respect to each other, and means including positionable means adjacent said nozzles movable along an axis making said angle with said longitudinal axis for varying the pressure in said pressure chambers in accordance with the magnitude and polarity of an electrical control signal.

7. In a valve for controlling the flow of fluid to a device movable thereby in accordance with a control signal, a main valve comprising a housing having a bore therein, a pistonlike valve spool slidably fitted therewithin, said housing having an inlet passage adapted to be connected to a source of fluid under pressure, a pair of outlet passages, ports connecting said passages with said bore, said valve spool having land portions cooperable with said outlet ports for controlling on movement thereof the flow of fluid from said inlet passage to one or the other of said outlet passages, said valve spool further including end land portions adapted to form with the extremities of said bore first and second pressure fluid chambers, said valve spool further including opposed first and second nozzles connected to said first and second pressure fluid chambers, respectively, a flapper intermediate said nozzles and adjacent thereto positionably disposed for varying the pressure in said pressure chambers, said nozzles and said flapper being skewed at an acute angle with respect to the longitudinal axis of said spool, at least a portion of said flapper extending within said spool, and a motive means responsive to said control signal and operably coupled to said flapper for positioning said flapper with respect to said nozzles.

8. In an electro-hydraulic servo valve including a main valve having a housing with a bore therein, a valve spool slidably fitted therewithin, said housing having an inlet passage adapted to be connected to a source of fluid under pressure, a pair of outlet passages, ports connecting said passages with said bore, said valve spool having land portions cooperable with said outlet ports for controlling the flow of fluid from said inlet passage to one or the other of said outlet passages, said valve spool further including end land portions adapted to form with the extremities of said bore first and second pressure fluid chambers, pressure reducing means connected between said pressure fluid source and said pressure fluid chambers, first and second opposed nozzles within said valve spool connected to said first and second pressure fluid chambers, respectively, said nozzles being integrally mounted within said valve spool at an angle to the longitudinal axis thereof, a flapper intermediate said nozzles and adjacent thereto positionably disposed for varying the pressure in said nozzles, said flapper having at least one dimension perpendicular to the axes of said nozzles and positionable along an axis defined by said axes, and motive means responsive to a control signal and operably coupled to said flapper for positioning thereof with respect to said nozzles in accordance with said control signal whereby movement of the flapper creates a differential pressure between said chambers that is equallized by movement of the valve spool to the position where the nozzles are again equidistant with respect to said flapper.

9. In a two-stage electro-hydraulic servo valve for controlling the flow of fluid to a device movable thereby in accordance with a control signal comprising first means for providing a first stage of amplification for said control signal, said first means including a valve spool having opposed nozzles integrally mounted therein at an angle to the longitudinal axis of said valve spool and a flapper intermediate said nozzles having at least one dimension substantially perpendicular to the axes of said nozzles and positionable along an axis defined by said axes in accordance with said control signal whereby the amplification effect of said first stage is proportional to said angle, and second means for providing a second stage of amplification for said control signal, said second means including a main valve having a bore therein in which said valve spool is slidably fitted.

References Cited in the file of this patent

UNITED STATES PATENTS

| | | |
|---|---|---|
| 2,526,709 | Tait | Oct. 24, 1950 |
| 2,526,804 | Carpenter | Oct. 24, 1950 |
| 2,615,466 | Garde | Oct. 28, 1952 |
| 2,709,421 | Avery | May 31, 1955 |
| 2,767,689 | Moog | Oct. 23, 1956 |
| 2,775,254 | Stanbury | Dec. 25, 1956 |
| 2,790,427 | Carson | Apr. 30, 1957 |
| 2,797,666 | Chubbuck | July 2, 1957 |
| 2,824,574 | Place | Feb. 25, 1958 |
| 2,835,265 | Brandstadter | May 20, 1958 |

FOREIGN PATENTS

| | | |
|---|---|---|
| 390,550 | Germany | Feb. 20, 1924 |
| 492,292 | Germany | Feb. 22, 1930 |
| 525,878 | Germany | June 4, 1931 |
| 730,577 | France | Jan. 27, 1932 |
| 910,115 | France | Jan. 21, 1946 |
| 246,086 | Switzerland | Sept. 1, 1947 |
| 730,965 | Great Britain | June 1, 1955 |